(12) United States Patent  (10) Patent No.: US 8,024,082 B2
Richter et al.  (45) Date of Patent: Sep. 20, 2011

(54) SYSTEM AND METHOD FOR OPTIMIZING ENERGY STORAGE COMPONENT USAGE

(75) Inventors: Timothy Gerard Richter, Wynantskill, NY (US); Weizhong Yan, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 335 days.

(21) Appl. No.: 12/401,726

(22) Filed: Mar. 11, 2009

(65) Prior Publication Data

US 2010/0235025 A1  Sep. 16, 2010

(51) Int. Cl.
*G06F 19/00* (2006.01)
*B60K 6/00* (2007.10)

(52) U.S. Cl. .......... 701/22; 701/213; 701/35; 180/65.21

(58) Field of Classification Search .................. None
See application file for complete search history.

(56) References Cited

U.S. PATENT DOCUMENTS

| | | | |
|---|---|---|---|
| 6,344,732 B2 * | 2/2002 | Suzuki | 320/132 |
| 6,507,127 B1 | 1/2003 | Amano et al. | |
| 6,721,637 B2 * | 4/2004 | Abe et al. | 701/22 |
| 6,949,897 B2 | 9/2005 | Wakashiro et al. | |
| 7,360,615 B2 | 4/2008 | Salman et al. | |
| 2005/0228553 A1 * | 10/2005 | Tryon | 701/22 |
| 2008/0119982 A1 | 5/2008 | Yamada | |
| 2008/0262668 A1 * | 10/2008 | Yamada | 701/22 |
| 2008/0319596 A1 | 12/2008 | Yamada | |
| 2009/0229900 A1 * | 9/2009 | Hafner et al. | 180/65.275 |

FOREIGN PATENT DOCUMENTS

| | | |
|---|---|---|
| EP | 0811757 A2 | 12/1997 |
| EP | 2000377 A2 | 12/2008 |

* cited by examiner

*Primary Examiner* — Michael J. Zanelli
(74) *Attorney, Agent, or Firm* — Ziolkowski Patent Solutions Group, SC; Jean K. Testa (57) ABSTRACT

A system for optimizing energy storage component usage in a vehicle comprising one of a hybrid vehicle and an electric vehicle, the vehicle comprising a computer programmed to identify if a vehicle position is associated with link data in a database of historical power usage data, the link data comprising measured historical power usage data for a link of vehicle travel. If the vehicle position is associated with the link data, the computer is programmed to obtain the link data of the link from the database, the link data absent terrain information from the database. The computer is also programmed to determine an expected vehicle power usage of the vehicle based on the obtained link data and optimize the energy storage component usage based on the expected vehicle power usage and based on efficiency and life cycle costs of an energy storage component of the vehicle if the vehicle position is associated with the link data.

21 Claims, 4 Drawing Sheets

SYSTEM AND METHOD FOR OPTIMIZING ENERGY STORAGE COMPONENT USAGE

GOVERNMENT RIGHTS IN THE INVENTION

The U.S. Government has a paid-up license in this invention and the right in limited circumstances to require the patent owner to license others on reasonable terms as provided for by the terms of Government Contract No. MA-0407001 awarded by the Federal Transit Administration of the United States Department of Transportation.

BACKGROUND OF THE INVENTION

The invention relates generally to hybrid and electric vehicles, and more specifically to optimization of energy storage component usage aboard hybrid and electric vehicles.

Hybrid electric vehicles combine an internal combustion engine and an electric motor that is typically powered by one or more electrical energy storage components. Such a combination may increase overall fuel efficiency by enabling the combustion engine and the electric motor to each operate in respective ranges of increased efficiency. Electric motors, for example, may be efficient at accelerating from a standing start, while combustion engines may be efficient during sustained periods of constant engine operation, such as in highway driving. Having an electric motor to boost initial acceleration allows combustion engines in hybrid vehicles to be smaller and more fuel efficient.

In many conventional hybrid vehicles, electric motors also enable the capture of braking energy by acting as generators and providing such captured braking energy to energy storage components (ESCs). ESCs such as batteries, ultracapacitors, or flywheels are used to capture energies present during braking or generation operations for reuse at a later time. These components also provide load-leveling functionality to reduce transient loading to the primary power-producing device in the system. Such installations generally operate with limited or no information about the environment and lack predictive capability to foresee upcoming events. This often results in sub-optimal usage of the ESCs that can shorten life because of unnecessary applied stresses. Often, ESCs are over-sized for the application to ensure that stress limits are not exceeded, which adds cost to the system. Because such vehicles are not aware of their surroundings or historical performance, in order to react to charging and discharging events, the state of charge of the ESC is maintained near the midpoint of the useable storage range of the ESC.

If the vehicle is traveling in a valley or along a high point in the local terrain, hybrid energy recovery may not be maximized. For example, if the vehicle were at a high point in the local terrain with the ESC state of charge at the midpoint, the impending downhill regenerative capture opportunity ceases when the battery reaches full state of charge, which may occur midway down the hill. Accordingly, the full downhill regenerative capture opportunity is stopped short. In addition, the battery will likely charge at 100% power, operate at the limits of stress, and create excessive heat and temperature rise. The converse is true for starting at a low point in the terrain where the hybrid assist is halted when the battery is exhausted of charge prior to reaching the summit.

It would therefore be desirable to have a system and method capable of optimizing usage of energy storage components in a hybrid power system.

BRIEF DESCRIPTION OF THE INVENTION

Embodiments of the invention are directed to system and method for energy storage component optimization that overcome the aforementioned drawbacks.

According to an aspect of the invention, a system for optimizing energy storage component usage in a vehicle comprising one of a hybrid vehicle and an electric vehicle, the vehicle comprising a computer programmed to identify if a vehicle position is associated with link data in a database of historical power usage data, the link data comprising measured historical power usage data for a link of vehicle travel. If the vehicle position is associated with the link data, the computer is programmed to obtain the link data of the link from the database, the link data absent terrain information from the database. The computer is also programmed to determine an expected vehicle power usage of the vehicle based on the obtained link data and optimize the energy storage component usage based on the expected vehicle power usage and based on efficiency and life cycle costs of an energy storage component of the vehicle if the vehicle position is associated with the link data.

According to another aspect of the invention, a method comprises determining whether a vehicle position of one of a hybrid vehicle and an electric vehicle is associated with a first link dataset in a database of historical power usage and velocity data, the first link dataset comprising measured power usage and velocity data related to a first link of vehicle travel. If the vehicle position is associated with the first link dataset, the method includes querying the database to obtain historical power usage and velocity data from the first link dataset, the queried data free of elevation data for the first link. The method also includes, if the vehicle position is associated with the first link dataset, calculating an expected power usage for the vehicle based on the queried data and optimizing an energy storage component usage for an energy storage component of the vehicle based on the expected power usage and based at least on efficiency and life cycle costs of the energy storage component of the vehicle such that operation of the energy storage component based on the optimized expected power usage achieves a desired usage of the energy storage component.

According to another aspect of the invention, a system comprises a vehicle and a power system configured to provide power to drive the vehicle, the power system comprising an energy storage component and a traction drive coupled to the energy storage component. The system includes a position sensor configured to measure a position of the vehicle and a computer configured to determine a correlation between the position of the vehicle and a segment of data comprising vehicle historical power usage data stored in a database. If the position and the segment of data are correlated, the computer is configured to obtain the segment of data from the database, the segment of data free of elevation data and to determine an expected vehicle power usage of the vehicle based on the obtained segment of data. The computer is configured to optimize an energy storage component usage based on the determined expected vehicle power usage and based on efficiency and life cycle costs of the energy storage component, the optimized energy storage component usage comprising target biasing state of charge setpoints for the energy storage component if the position and the segment of data are correlated.

Various other features and advantages will be made apparent from the following detailed description and the drawings.

BRIEF DESCRIPTION OF THE DRAWINGS

The drawings illustrate one or more embodiments of the invention.

In the drawings.

DETAILED DESCRIPTION

The invention includes embodiments that relate to optimization of energy storage component usage. The invention includes embodiments that relate to methods for generating expected power usage for a hybrid vehicle. The invention is described with respect to a hybrid vehicle. The embodiments and methods illustrated herein may be applied to hybrid vehicles, range extended electric vehicles, plug-in hybrid electric vehicles (PHEV), multi-energy storage electric vehicles, and the like. The embodiments and methods illustrated herein may be broadly applied to passenger and commercial hybrid vehicles as well as to locomotives and off-highway vehicles. It should also be understood that a vehicular implementation is only one of many uses for this technology. Any system containing power generation, consumption, and energy storage components is a candidate for incorporating embodiments of the invention.

Figure 1:
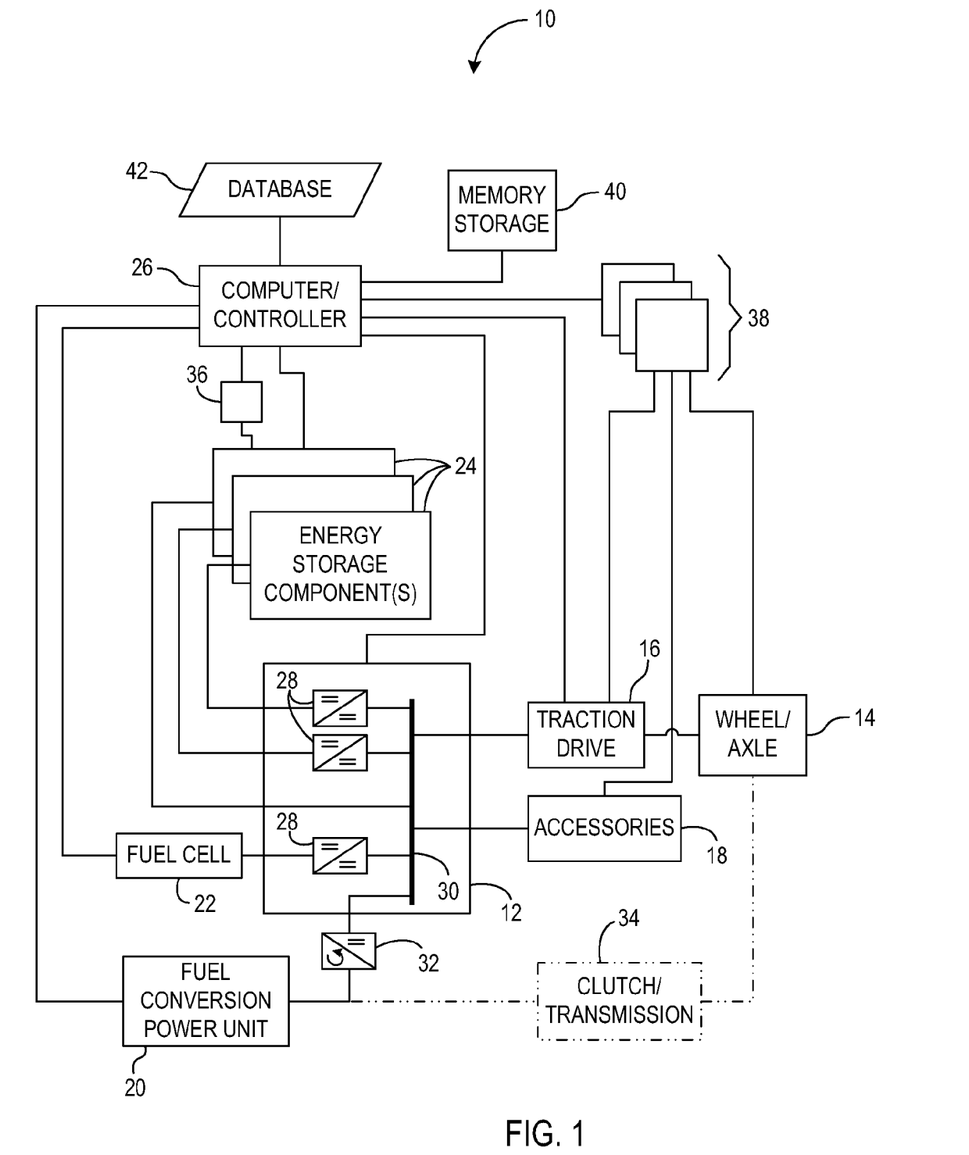
FIG. 1 is a schematic diagram of a hybrid system according to an embodiment of the invention.

FIG. 1 illustrates an exemplary hybrid vehicle 10 incorporating embodiments of the invention. Hybrid vehicle 10 includes an energy management system (EMS) 12 configured to impart power to a wheel or axle 14 via an electric or traction drive 16 of hybrid vehicle 10. Energy management system 12 is also configured to impart power to accessories 18 of hybrid vehicle 10. Accessories 18 may include, but are not limited to, an air conditioning/heating system, a radio, and a vehicle lighting system. Hybrid vehicle 10 includes a fuel conversion unit 20, such as an internal combustion engine (ICE), coupled to EMS 12 and may include a fuel cell 22 coupled to EMS 12. An energy storage component (ESC) or bank of ESCs 24 is also coupled to EMS 12. ESCs may be, for example, batteries.

Hybrid vehicle 10 includes a computer/controller 26 coupled to EMS 12 to selectively control power transfer to traction drive 16 from fuel conversion unit 20, fuel cell 22, or the ESCs 24. Energy management system 12 may include a DC/DC converter 28 for each energy source input into EMS 12 if DC conversion from the energy source to a DC link 30 is needed. FIG. 1 shows three DC/DC converters 28 in EMS 12; however, it is contemplated that more or less than three DC/DC converters 28 may be included. Furthermore, fuel conversion unit 20 may be coupled to energy management system 12 via a torque/DC converter 32 for converting torque from fuel conversion unit 20 into DC energy suitable for DC link 30.

By controlling both fuel conversion unit 20 and ESCs 24 to supply input power into EMS 12, ESCs 24 may assist fuel conversion unit 20 in imparting power to traction drive 16 by drawing energy therefrom. In this manner, ESCs 24 and fuel conversion unit 20 may simultaneously provide power to traction drive 16 during periods of acceleration or hill climbs, for example.

It is contemplated that, in a parallel configuration shown in phantom, fuel conversion unit 20 may be coupled to axle 14 via a clutch/transmission assembly 34. In this configuration, the coupling of fuel conversion unit 20 to energy management system 12 via torque/DC converter 32 would not be needed. Other hybrid configurations such as, for example, a hydraulic hybrid including a manifold are contemplated and envisioned herein.

Further, traction drive 16 and EMS 12 may be controlled to provide recharging power to recharge ESCs 24. For example, during braking operations of hybrid vehicle 10, by controlling EMS 12 and by operating traction drive 16 in a generator mode, torque generated in wheel or axle 14 may be directed to electric motor 16 to slow or brake hybrid vehicle 10 and to convert and store the energy therefrom in ESCs 24. As such, energy used to slow or stop hybrid vehicle 10 during regenerative braking may be recaptured and stored in ESCs 24 for later use to provide power to hybrid vehicle 10 or accessories 18 thereof. Monitoring of the state of charge (SOC) of the battery 24 may be accomplished via a state of charge sensor 36 coupled to ESCs 24 and to computer 26 to aid in the charging and discharging of energy from ESCs 24.

FIG. 1 further illustrates computer 26 configured to receive information from a plurality of sensors 38 and to store the received information in a computer readable memory storage 40. In an embodiment of the invention as described below with respect to FIG. 2, computer 26 may be configured to receive sensor data from sensors 38 while hybrid vehicle 10 travels along a road network and to store the sensor data in memory storage 40 for further processing and storage in a database 42. In an embodiment of the invention as described below with respect to FIG. 6, computer 26 may be configured to generate and optimize an expected power usage for the route based on the data stored in database 42.

While FIG. 1 is illustrated with respect to an exemplary hybrid vehicle 10, embodiments of the invention are not limited to such. It is contemplated that embodiments of the invention also include any electric-based vehicle having, for example, a fuel conversion unit or not. Examples of vehicles incorporating embodiments of the invention include, but are not limited to, hybrid vehicles, electric vehicles (EVs), range extended EVs, plug-in hybrid electric vehicles (PHEVs), multi-energy storage EVs, and the like.

Figure 2:
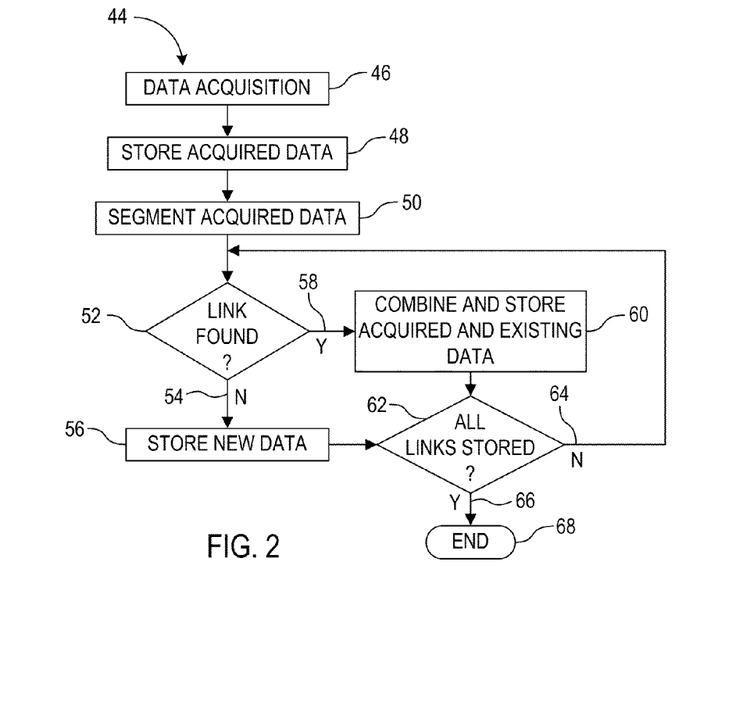
FIG. 2 is a flowchart showing a technique for acquiring and storing energy and power usage data during vehicle travel according to an embodiment of the invention.

FIG. 2 shows a technique 44 for acquiring and storing energy and power usage data during vehicle travel according to an embodiment of the invention. Technique 44 may be programmed into a computer or controller such as computer 26 of FIG. 1. At step 46, data sets are measured or acquired of a hybrid vehicle via sensors such as sensors 38 of FIG. 1 as the vehicle travels from one location to another. Examples of measured data include, but are not limited to, traction motor power usage, accessory load power usage, vehicle speed, latitude and longitude of the vehicle, and date and time stamps of when the data is acquired. Other types of data relevant to an energy optimization technique may also be measured.

Figure 3:
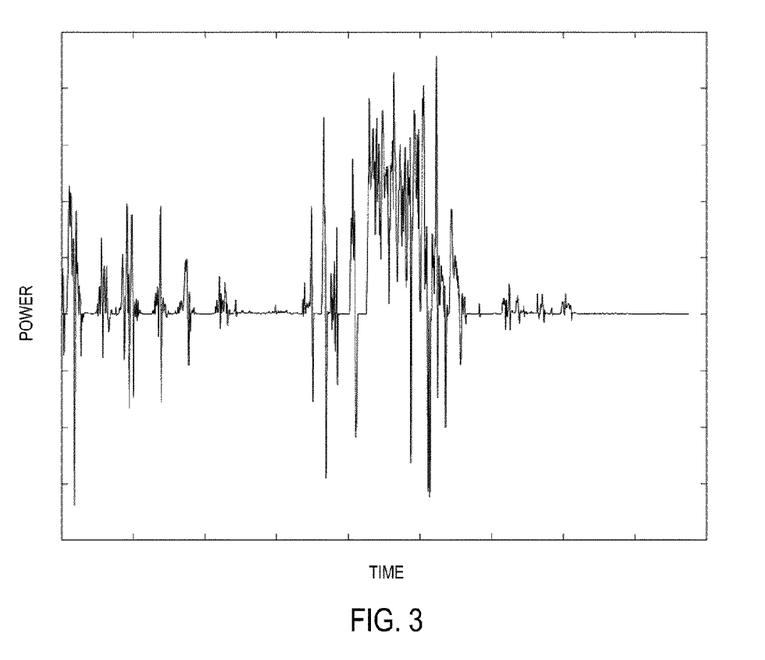
FIG. 3 is a plot showing exemplary data measured along a route using a time-based measurement interval.
Figure 4:
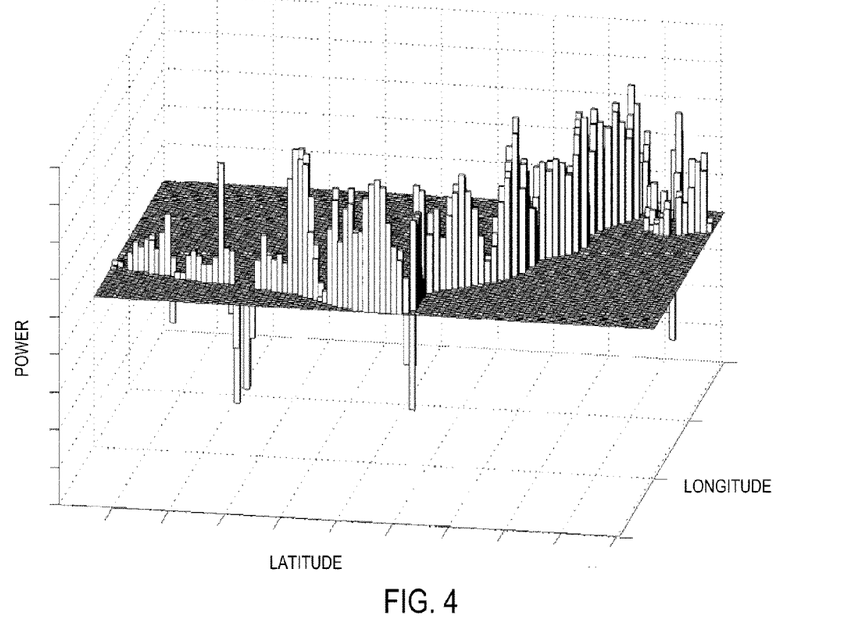
FIG. 4 is a plot showing exemplary data measured along a route using a positional-based measurement interval.

In one embodiment, each data set is measured or recorded at regular measurement intervals such as an interval of time (e.g., once per second) or such as an interval of position (e.g., once per five hundred feet). FIG. 3 shows an exemplary plot of data measured using a time interval as the measurement interval. FIG. 4 shows an exemplary plot of data measured using a position interval such as latitude and longitude as the measurement interval. Each measured data set also relates to the direction or heading of travel.

Referring again to FIG. 2, each collected data set is stored in a memory storage such as memory storage 40 of FIG. 1 at step 48. As the hybrid vehicle travels from one location to another, multiple data sets are acquired and stored as the measurement intervals direct. However, according to an embodiment of the invention, terrain data, including relief or surface features/configuration of an area of land such as gradients, elevation, or topography, are not stored. In this manner, topographical, elevational, or three-dimensional mapping data is not needed for expected energy optimization.

The stored data is segmented at step 50. Segmenting splits the stored acquired data into a plurality of sub-records or links such that the records can be conveniently stored into the database. Similar to a road map network representation, links are uniquely defined by start and end nodes. Often, a start or end node overlaps with a start or end node of another link. Nodes may be defined in a number of ways. A first way is to directly define nodes using the nodes defined on a digital map of a region of interest containing the routes that the hybrid vehicle has traveled. A second way is to define nodes based on characteristic changes of the recorded power or related waveforms. A third way is to set nodes as the intersections of cycle trajectories, which can be analytically determined from the measured data stored in the database. After nodes are such defined, links between start and end nodes are identified and uniquely numbered.

At step 52, technique 44 determines whether a link identified in the segmenting step is associated with a link already stored in a database such as database 42 of FIG. 1. If the link is not associated with stored data 54, then the link data is added as a new entry into the database at step 56. If the link is associated with data previously stored in the database 58, then the acquired link data is combined with the existing link data at 60.

Combining combines acquired data and stored records for the same cycles and operating regimes into a single record. Combining considers process variation and measurement errors to best represent measured values for the same indices as one process. The acquired data can be interpolated or averaged with the stored data. In addition, different cycles in the same operating regime can be interpolated or averaged to reduce the collected data set. Acquired data from one or more different vehicles of a fleet and from different days and times may be combined in this manner. Also, combining may include combinations performed only for the cycles within a window of an independent index such as time of day or ambient temperature. Statistics of the combining records are calculated and stored. Statistics may include the number of times or frequency of hybrid vehicle travel along a particular link.

Power, speed, and other performance information associated with each link measured at regular intervals along the link are combined or stored into the database with, for example, link identifications (IDs) as the key field. Table 1 illustrates an example of link data stored in the database for link L112.

TABLE 1

| | LINK ID<br>L112 |
|---|---|
| Start Node | N35 |
| End Node | N23 |
| Power | (a) |

TABLE 1-continued

| | LINK ID<br>L112 |
|---|---|
| Speed | (b) |
| Frequency | 8 |
| Time Window | 3 |

In an embodiment of the invention, data associated with the power and speed of link L112 illustrated in Table 1 are multi-element vectors corresponding to measured points along the link. Data associated with nodes such as start node N35 may be stored in a separate table in the database. The node data may include longitude and latitude positions measured or calculated for the node.

In one embodiment, the node IDs in the database may be related to each of the links leading to and from the node together with the frequency that a hybrid vehicle has traveled along the link. Table 2 illustrates an example of a relationship between nodes and links together with the frequency of vehicle travel data recordation.

TABLE 2

| | NODE ID | LINK IN | LINK OUT | FREQUENCY (%) |
|---|---|---|---|---|
| 1 | N22 | L111 | L117 | 100 |
| 2 | N22 | L116 | L117 | 40 |
| 3 | N22 | L116 | L113 | 60 |
| 4 | N23 | L109 | L111 | 70 |
| 5 | N23 | L109 | L114 | 15 |
| 6 | N23 | L109 | L115 | 15 |
| 7 | N23 | L112 | L110 | 40 |
| 8 | N23 | L112 | L111 | 30 |
| 9 | N23 | L112 | L115 | 10 |
| 10 | N23 | L113 | L110 | 80 |
| 11 | N23 | L113 | L114 | 15 |
| 12 | N23 | L113 | L115 | 5 |
| 13 | N23 | L118 | L110 | 50 |
| 14 | N23 | L118 | L111 | 30 |
| 15 | N23 | L118 | L114 | 20 |

As shown in Table 2, node ID N22 has two incoming links and two outgoing links associated therewith. Node ID N23 has four incoming links and four outgoing links associated therewith.

After acquired data is stored 56 or combined 60, technique 44 determines whether data for more sub-records or links remain to be stored or combined at step 62. If more link data remain 64, process control returns to step 62 and continues as described above. If all link data has been stored 66, technique 44 ends 68.

Accordingly, technique 44 includes the creation and storage of a database that that includes historical power usage data by the electric motor and other electrical components of a hybrid vehicle along one or more links. It is contemplated that technique 44 is performed as an on-going process as the links are repeatedly traveled by vehicles such that data for each link may be refined. Expected energy usage along a link or expected route may be optimized based on the data stored in the database created via technique 44 as will be described below with respect to FIG. 6.

Figure 5:
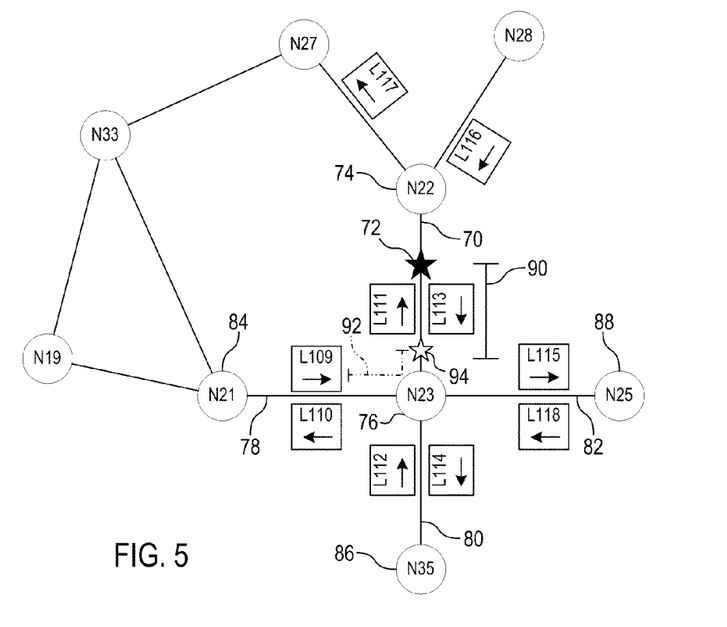
FIG. 5 is a schematic diagram showing links from which information may be measured and stored in a link database according to an embodiment of the invention.

FIG. 5 shows a schematic diagram or network of links from which information may be measured and stored in a link database according to an embodiment of the invention. A first link 70, identified by a link identifier of L113, represents a current link that a vehicle 72 is currently travelling on. First link 70 has a start node 74, identified by a node identifier of N22, and an end node 76, identified by a node identifier of N23. A plurality of links 78, 80, 82, identified by link identifiers L110, L114, and L115, respectfully, has node N23 as a starting node. Links 78-82 have respective end nodes 84, 86, 88, identified by node identifiers N21, N35, and N25, respectively. Links 70, 78-82 are directional such that travel, for example, from node 76 to node 84 corresponds to one link, L110, while travel in the opposite direction from node 84 to node 76 corresponds to another link, L109.

Figure 6:
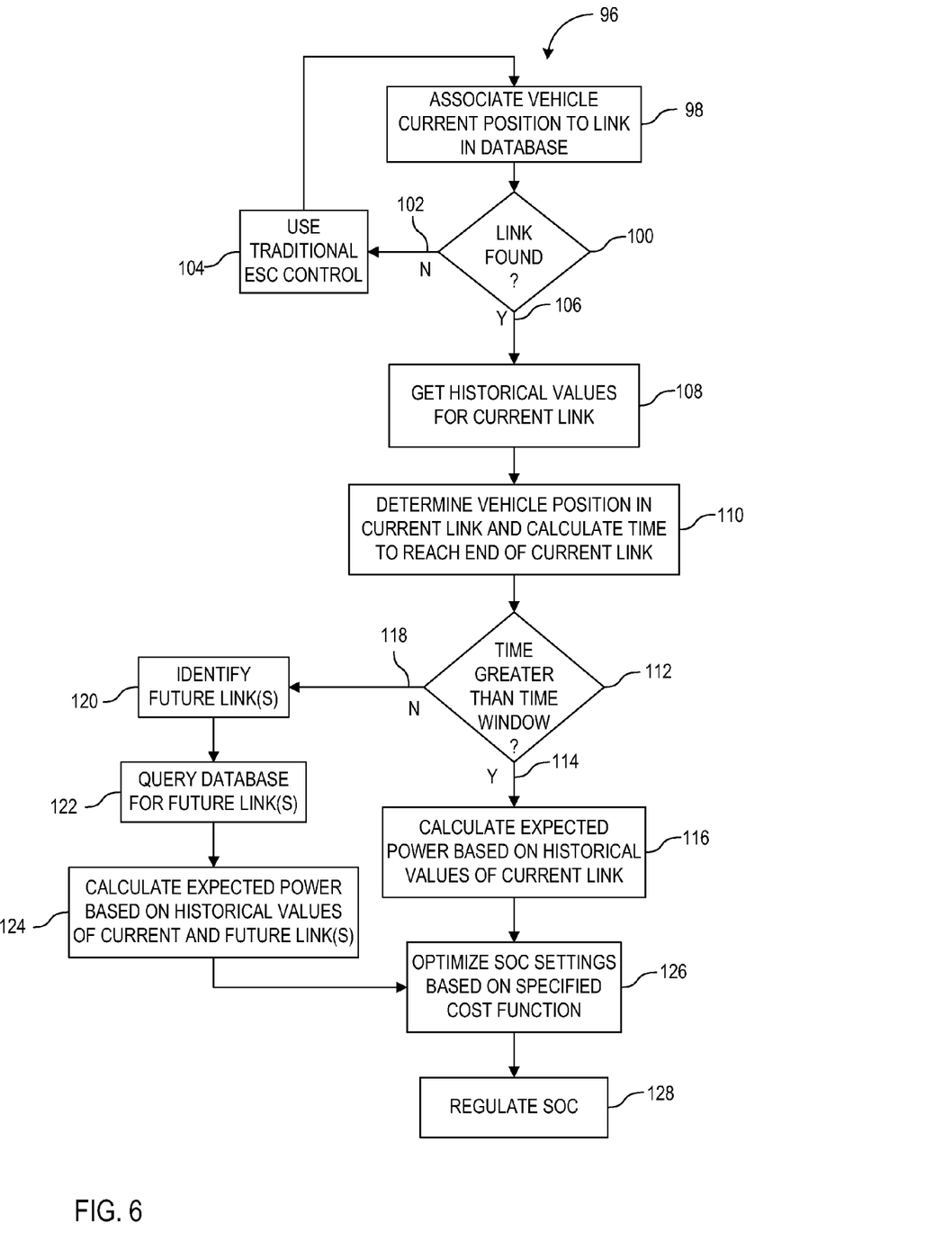
FIG. 6 is a flowchart showing a technique for calculating expected power usage and optimizing state of charge values for an energy storage component according to an embodiment of the invention.

FIG. 6 shows a technique 96 for calculating expected power usage and optimizing state of charge values for an energy storage component according to an embodiment of the invention. Technique 96 may be programmed into a computer or controller such as computer 26 of FIG. 1. Technique 96 begins at step 98 by associating a vehicle current position to a link in a database. The link may be found by measuring the latitude and longitude or position of the vehicle and a direction of vehicle travel via a Global Positioning System (GPS) sensor, for example. The vehicle position data may be compared with end node position data for the links in the database and with positions interpolated between the end nodes. At step 100, technique 96 determines whether a link from the database has been found having data corresponding to the vehicle position and direction of vehicle travel.

If no link in the database is found 102, a traditional ESC control is used at step 104 since no historical data exists in the database. According to one embodiment, the traditional ESC control controls a state of charge of the energy storage component(s) of the hybrid vehicle toward a midpoint value in the range of state of charge values. For example, the default state of charge of the energy storage component of the hybrid vehicle may be set to a value midway between a maximum charge and a minimum charge of the energy storage component. If a link is found 106, the link is set as the current link, and historical values for the current link are acquired from the database at step 108. According to an embodiment of the invention, terrain data, gradients, elevation, or topography for the current link are not acquired.

At step 110, the position of the vehicle within the current link is determined, and the time the vehicle will likely take to reach the end of the current link is calculated. In one embodiment, technique 96 calculates expected power usage and optimizes, over a window of time or time interval, the state of charge values for energy storage components of a hybrid vehicle. For example, optimization of the state of charge settings may include optimizing the settings for a five-minute interval. Other intervals of time are also contemplated herein. FIG. 5 illustrates an example of a time window 90 extending from the current position of vehicle 72 and in the direction of travel.

At step 112, technique 96 determines whether the time calculated for the vehicle to reach the end of the current link is greater than the time window. If the time calculated for the vehicle to travel in the current link is greater than the time window 114, an expected power usage by the hybrid vehicle is calculated at step 116 based on the historical values acquired at step 108, based on the time window, and based on the vehicle position. For example, FIG. 5 shows that time window 90, which begins at the position of vehicle 72, is less than the time expected for vehicle 72 to reach the end of link L113.

If the vehicle is expected to reach the end of the current link and to continue travel via another future link before the end of the time window 118, technique 96 includes data based on the future link when calculating expected power usage. Accordingly, technique 96 includes identification of one or more future links 120 that the vehicle may travel along after reaching the end node of the current link. In one embodiment, all links that have a start node in common with the end node of the current link may be selected for identification. Future link identification may ignore a link that travels in the opposite direction to the current link if desired.

After identification of future links at step 120, the database of historical stored values is queried at step 122 to retrieve data related to the future link(s). For example, the historical power usage data, frequency of link travel, and other statistics of each identified future link may be retrieved. Additionally, relevant link data such as data related to the current time of the day or vehicle type may be retrieved while link data related to a different time of the day may be ignored. According to an embodiment of the invention, the retrieved data is absent terrain data.

Expected power usage is calculated at step 124 based on the time window and vehicle position and based on the acquired historical values of the portions of the current and future links corresponding to the expected vehicle travel. In one embodiment, the portion of expected power usage that is based on future link travel may be determined solely from the future link having the highest frequency of travel after the end node of the current link is reached. For example, referring to FIG. 5 and rows 10-12 in Table 2 above, a time window 92 (shown in phantom) based on a position 94 of vehicle 72 extends beyond end node N23 of link L113. As shown in Table 2, link L110 has a higher frequency of travel than links L114 and L115 when vehicle 72 travels beyond node N23 after travelling on link L113. In this embodiment, the respective portions of the current link, L113, and the most likely future link, L110, are used to calculate the expected power usage.

In another embodiment, the portion of expected power usage that is based on future link travel may be determined from a weighted average of some or all probable future links based on their frequency of travel after the end node of the current link is reached. For example, referring to FIG. 5 and rows 10-12 in Table 2 above and based on position 94 of vehicle 72, portions of links L110, L114, and L115 each contribute to that portion of expected power usage calculation based on future link travel. In this embodiment, the relevant data from links L110, L114, and L115 are averaged according to weights 0.80, 0.15, and 0.05, respectively, based on their frequency.

Based on the historical power usage demands previously measured along the link or links that the vehicle is expected to travel, the expected power usage calculated at either step 116 or step 124 determines biasing state of charge setpoints of the battery or energy storage component of the hybrid vehicle above or below a midpoint state of charge to optimize battery power usage. The biasing state of charge setpoints are optimized based on specified cost functions at step 126. The cost functions are used to provide vehicle operation optimization of the energy storage components used with the engine or fuel cell. By assigning costs to different aspects of battery use and energy management, a reduced life cycle cost for the vehicle system can be provided. Examples of cost functions are amp-hour throughput; depth of discharge, charge, and discharge rates; fuel converter operating points (efficiency); emission outputs; and the like. In this manner, optimization of the battery may consider trade-offs between life cycle and efficiency costs.

The optimization of state of charge settings may set biasing state of charge setpoints along an expected route of vehicle travel such that the battery may be near a fully-charged state of charge just prior to large or sustained power requirements to supply boosting power during increased power usage periods. The optimization of state of charge settings may also set biasing state of charge setpoints along the expected route such that the battery may be near a fully-discharged state of charge just prior to large or sustained power generation opportunity to such that regenerative braking of a traction motor may supply charging power to recharge the battery to the next biasing state of charge setpoint. Furthermore, the optimization of state of charge settings may optimize the charging or discharging of the battery to extend its life. For example, a rate of charging may be reduced based on knowledge of the historical data that an extended opportunity for charging will occur. In this manner, the battery may be slowly recharged over, for example, a 10 mile stretch of road to a 100% state of charge instead of being quickly recharged over the first 2 miles of the 10 mile stretch while leaving no recharging during the last 8 miles. In this manner, lower stresses to the battery, lower resistive losses, crystal growth control, and lower battery temperature all contribute to an increase in battery life while increasing efficiency considering charging losses.

Accordingly, optimization of state of charge settings includes optimization of engine or fuel cell and energy storage component usage along the expected route of vehicle travel. For example, the optimized state of charge settings may cause the computer 26 of FIG. 1 to reduce a current state of charge of the ESCs 24 to a lower level such that efficient use of the fuel conversion unit 20 may be achieved during a period of acceleration based on the cost functions. The optimized state of charge settings may also cause the computer 26 of FIG. 1 to increase a current state of charge of the ESCs 24 to a higher level set by the expected power such that efficient use of regenerative braking may be achieved during a period of negative power use based on the cost functions. Additionally, the optimized state of charge settings may cause the computer 24 to operate traction motor 16 in a generating mode to increase a current state of charge of the ESCs 24 to a higher level even when a regenerative braking opportunity is not imminent such that a sustained power boost may be supplied thereafter by the traction motor 16 in a motoring or traction mode during an upcoming increased power demand period.

After the state of charge settings are optimized 126, the ESC state of charge may be regulated according to the optimized state of charge settings at step 128 during travel of the hybrid vehicle along the expected route. Referring also to FIG. 1, if a target biasing state of charge setpoint set by the optimized state of charge settings according to the present location of hybrid vehicle 10 within the current link is lower than the current ESC state of charge measured or determined by state of charge sensor 36, the optimized state of charge settings cause the computer 26 to reduce a current state of charge of ESCs 24 to the lower biasing state of charge setpoint set by the optimized state of charge settings. Decreasing the ESC state of charge may be achieved by operating the traction motor 16 via ESCs 24 in a motoring or traction mode. If the biasing state of charge setpoint set by the optimized state of charge settings according to the present location of hybrid vehicle 10 within the current link is higher than the current ESC state of charge, the optimized state of charge settings cause the computer 26 to charge battery 24 to the higher biasing state of charge setpoint set by the optimized state of charge settings. Increasing the ESC state of charge may be achieved during a regenerative braking mode when no power from fuel conversion unit 20 is being supplied to EMS 12 or during transfer of some power from fuel conversion unit 20 to EMS 12.

The present location of hybrid vehicle 10 within the current link along the expected route may be determined from a location sensor 38 or via a time interval, for example. If the current link that the vehicle is travelling along is determined to be a different one than is set for the current optimized state of charge settings, a new set of optimized state of charge settings may be generated as described above.

Embodiments of the invention allow energy storage components of hybrid power systems to be prepared for upcoming events. Accordingly, rather than including a large energy storage component set to maintain a state of charge at 50% to provide power for unknown future events, a smaller energy storage component may be used by taking advantage of known future power demands for state of charge control. Accordingly, controlling energy storage component according to embodiments of the invention allows for a cost reduction achieved through a smaller device and through increasing its life cycle due to lower life-impacting stresses thereof such as high current charging and discharging.

A technical contribution for the disclosed system and method is that it provides for a computer-implemented expected power usage estimation and optimization of state of charge settings for an energy storage component along an expected route to maximize total energy expended by or stored in the energy storage component.

Therefore, according to an embodiment of the invention, a system for optimizing energy storage component usage in a vehicle comprising one of a hybrid vehicle and an electric vehicle, the vehicle comprising a computer programmed to identify if a vehicle position is associated with link data in a database of historical power usage data, the link data comprising measured historical power usage data for a link of vehicle travel. If the vehicle position is associated with the link data, the computer is programmed to obtain the link data of the link from the database, the link data absent terrain information from the database. The computer is also programmed to determine an expected vehicle power usage of the vehicle based on the obtained link data and optimize the energy storage component usage based on the expected vehicle power usage and based on efficiency and life cycle costs of an energy storage component of the vehicle if the vehicle position is associated with the link data.

According to another embodiment of the invention, a method comprises determining whether a vehicle position of one of a hybrid vehicle and an electric vehicle is associated with a first link dataset in a database of historical power usage and velocity data, the first link dataset comprising measured power usage and velocity data related to a first link of vehicle travel. If the vehicle position is associated with the first link dataset, the method includes querying the database to obtain historical power usage and velocity data from the first link dataset, the queried data free of elevation data for the first link. The method also includes, if the vehicle position is associated with the first link dataset, calculating an expected power usage for the vehicle based on the queried data and optimizing an energy storage component usage for an energy storage component of the vehicle based on the expected power usage and based at least on efficiency and life cycle costs of the energy storage component of the vehicle such that operation of the energy storage component based on the optimized expected power usage achieves a desired usage of the energy storage component.

According to another embodiment of the invention, a system comprises a vehicle and a power system configured to provide power to drive the vehicle, the power system comprising an energy storage component and a traction drive coupled to the energy storage component. The system includes a position sensor configured to measure a position of the vehicle and a computer configured to determine a correlation between the position of the vehicle and a segment of data comprising vehicle historical power usage data stored in a database. If the position and the segment of data are correlated, the computer is configured to obtain the segment of data from the database, the segment of data free of elevation data and to determine an expected vehicle power usage of the vehicle based on the obtained segment of data. The computer is configured to optimize an energy storage component usage based on the determined expected vehicle power usage and based on efficiency and life cycle costs of the energy storage component, the optimized energy storage component usage comprising target biasing state of charge setpoints for the energy storage component if the position and the segment of data are correlated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A vehicle comprising
one of a hybrid vehicle and an electric vehicle;
an energy storage component; and
a computer programmed to:
    identify if a vehicle position is associated with link data in a database of historical power usage data, the link data comprising measured historical power usage data for a link of vehicle travel; and
    if the vehicle position is associated with the link data:
        obtain the link data of the link from the database, the link data absent terrain information from the database;
        determine an expected vehicle power usage of the vehicle based on the obtained link data; and
        optimize usage of the energy storage component based on the expected vehicle power usage and based on efficiency and life cycle costs of the energy storage component of the vehicle.

2. The vehicle of claim 1 wherein the computer is further programmed to:
    collect vehicle data as the vehicle travels along the link; and
    store the collected vehicle data in the database.

3. The vehicle of claim 2 wherein the computer, in being programmed to collect vehicle data, is programmed to collect traction motor power usage based on a measurement interval as the vehicle travels.

4. The vehicle of claim 3 wherein the measurement interval comprises one of time and a vehicle position.

5. The vehicle of claim 3 wherein the computer, in being programmed to collect vehicle data, is further programmed to collect one of an accessory load power usage, a vehicle speed, a latitude and a longitude of the vehicle, a date of data acquisition, and a time of data acquisition.

6. The vehicle of claim 5 wherein the computer, in being programmed to store the collected vehicle data, is programmed to:
    segment vehicle data collected from vehicle travel into a plurality of links;
    associate a portion of the segmented vehicle data with the link data in the database;
    combine the segmented vehicle data with data previously collected and stored for the link if the data previously collected and stored for the link exists; and
    add the segmented vehicle data as a new entry into the database if the data previously collected and stored for the link does not exist.

7. The vehicle of claim 6 wherein the computer, in being programmed to segment vehicle data into links, is programmed to define a start node and an end node for the link based on one of nodes defined on a digital map of an interest region, characteristic changes of the collected vehicle data, and intersections of two traveled trajectories.

8. The vehicle of claim 6 wherein the computer, in being programmed to combine the collected vehicle data, is programmed to one of interpolate and average the collected vehicle data with the data previously collected and stored for the link.

9. The vehicle of claim 6 wherein the computer, in being programmed to combine the collected vehicle data, is programmed to combine the collected vehicle data with data previously collected via one of another vehicle and a fleet of other vehicles.

10. The vehicle of claim 1 further comprising:
a vehicle position sensor; and
wherein the computer is further programmed to:
    measure the vehicle position via the vehicle position sensor;
    measure a direction of travel of the vehicle via the vehicle position sensor; and
    identify if the link data in the database are associated with the direction of travel.

11. The vehicle of claim 10 wherein the vehicle position sensor comprises a Global Positioning System (GPS) sensor.

12. The vehicle of claim 1 wherein the computer is further programmed to set a default state of charge of an energy storage component of the vehicle halfway between a maximum charge and a minimum charge of the energy storage component if the vehicle position is not associated with any link data in the database.

13. A method comprising:
determining whether a vehicle position of one of a hybrid vehicle and an electric vehicle is associated with a first link dataset in a database of historical power usage and velocity data, the first link dataset comprising measured power usage and velocity data related to a first link of vehicle travel; and
if the vehicle position is associated with the first link dataset:
    querying the database to obtain historical power usage and velocity data from the first link dataset, the queried data free of elevation data for the first link;
    calculating an expected power usage for the vehicle based on the queried data; and
    optimizing an energy storage component usage for an energy storage component of the vehicle based on the expected power usage and based at least on efficiency and life cycle costs of the energy storage component of the vehicle such that operation of the energy storage component based on the optimized expected power usage achieves a desired usage of the energy storage component.

14. The method of claim 13 further comprising setting a default state of charge of the energy storage component of the vehicle midway between a maximum charge and a minimum charge of the energy storage component if the vehicle position is not associated with the first link dataset.

15. The method of claim 13 further comprising:
determining a time in which the vehicle is expected to reach an end of the first link based on the vehicle position and historical velocity data;
determining whether the time is greater than a time window of travel; and
if the time is less than the time window of travel:
identifying at least one future link extending from an end node of the first link;
querying the database for historical power usage data measured previously for the at least one future link, the historical power usage data free of elevation data for the at least one future link; and
wherein calculating the expected power usage for the vehicle comprises calculating the expected power usage for the vehicle based on the queried historical power usage data related to the first link and to the at least one future link.

16. The method of claim 15 wherein calculating the expected power usage comprises calculating a weighted average of the historical power usage data measured previously for the at least one future link based on a frequency of vehicle travel along the at least one future link.

17. The method of claim 15 further comprising:
measuring the vehicle position and velocity via a navigation system;
measuring a direction of travel of the vehicle; and
wherein determining whether the vehicle position is associated with the first link dataset comprises comparing the first link dataset with the measured vehicle position and with the measured direction of travel.

18. The method of claim 17 wherein measuring the vehicle position comprises measuring the vehicle position via a Global Positioning System (GPS) sensor.

19. A system comprising:
a vehicle;
a power system configured to provide power to drive the vehicle, the power system comprising:
an energy storage component; and
a traction drive coupled to the energy storage component;
a position sensor configured to measure a position of the vehicle;
a database comprising stored vehicle historical power usage data; and
a computer configured to:
determine a correlation between the position of the vehicle and a segment of the vehicle historical power usage data stored in the database; and
if the position and the segment of data are correlated:
obtain the segment of data from the database, the segment of data free of elevation data;
determine an expected vehicle power usage of the vehicle based on the obtained segment of data; and
optimize an energy storage component usage based on the determined expected vehicle power usage and based on efficiency and life cycle costs of the energy storage component, the optimized energy storage component usage comprising target biasing state of charge setpoints for the energy storage component.

20. The system of claim 19 further comprising:
a state of charge sensor coupled to the energy storage component and configured to measure a state of charge of the energy storage component; and
wherein the computer is further configured to:
identify a target biasing state of charge setpoint based on a position of the vehicle;
determine a state of charge of the energy storage component via the sensor; and
operate the power system to move the state of charge of the energy storage component toward the target biasing state of charge setpoint.

21. The system of claim 20 wherein the computer, in being configured to operate the power system is configured to operate the traction drive in one of a traction mode and a regenerative braking mode.

* * * * *